(12) United States Patent
Zaragoza Obregón et al.

(10) Patent No.: US 12,479,398 B2
(45) Date of Patent: Nov. 25, 2025

(54) LOCKING SEATBELT BUCKLE

(71) Applicant: Ford Global Technologies, LLC, Dearborn, MI (US)

(72) Inventors: Yesica Yosselin Zaragoza Obregón, Cuautitlán Izcalli (MX); Erick Mendoza Rodriguez, Cuautitlán Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/660,350

(22) Filed: May 10, 2024

(65) Prior Publication Data

US 2025/0346207 A1    Nov. 13, 2025

(51) Int. Cl.
    *B60R 22/18*    (2006.01)
    *B60R 22/32*    (2006.01)

(52) U.S. Cl.
    CPC .............. *B60R 22/18* (2013.01); *B60R 22/32* (2013.01); *B60R 2022/1812* (2013.01)

(58) Field of Classification Search
    CPC ..... B60R 22/18; B60R 22/322; B60R 22/321; B60R 22/32; B60R 2022/1806; B60R 2022/1812
    USPC ...................... 280/801.1; 24/163 R
    See application file for complete search history.

(56) References Cited

U.S. PATENT DOCUMENTS

| | | | |
|---|---|---|---|
| 5,522,619 A * | 6/1996 | Collins | A44B 11/2503 280/806 |
| 7,731,237 B2 * | 6/2010 | Eusebi | B60R 22/00 280/808 |
| 7,797,803 B2 * | 9/2010 | Falb | A44B 11/25 24/579.11 |
| 8,240,012 B2 | 8/2012 | Walega et al. | |
| 10,179,563 B2 * | 1/2019 | Ammons | B60R 22/321 |
| 10,470,528 B2 * | 11/2019 | Jimenez Hernandez | A44B 11/2573 |
| 10,857,971 B1 | 12/2020 | Davis | |
| 11,345,306 B1 * | 5/2022 | Jaradi | B60R 22/3405 |
| 11,751,642 B2 | 9/2023 | Chiu et al. | |
| 11,796,176 B2 | 10/2023 | Vallejo Ruiz et al. | |
| 2004/0051293 A1 | 3/2004 | Go | |
| 2007/0182139 A1 | 8/2007 | Tabe | |
| 2010/0302022 A1 | 12/2010 | Saban | |
| 2014/0188347 A1 | 7/2014 | Tabe | |
| 2018/0208151 A1 | 7/2018 | Jimenez Hernandez et al. | |
| 2018/0334134 A1 | 11/2018 | Desoyza | |
| 2019/0009695 A1 | 1/2019 | Schonfeld et al. | |
| 2022/0156870 A1 | 5/2022 | Jiang | |
| 2023/0065807 A1 * | 3/2023 | Jaradi | B60R 22/19 |

FOREIGN PATENT DOCUMENTS

| | | |
|---|---|---|
| CN | 108790969 A | 11/2018 |
| CN | 208393175 U | 1/2019 |
| WO | 2019114383 A1 | 6/2019 |

* cited by examiner

*Primary Examiner* — Paul N Dickson
*Assistant Examiner* — Caitlin Anne Miller
(74) *Attorney, Agent, or Firm* — Frank A. Mackenzie; Brooks Kushman P.C.

(57) ABSTRACT

A seatbelt buckle includes a frame operable to receive a seatbelt latch plate therein. A retainer is carried by the frame and movable between a latched position and an unlatched position. A resilient member is positioned between the frame and the retainer to urge the retainer toward the unlatched position. An actuator is positioned to lock the retainer in the latched position when activated.

20 Claims, 9 Drawing Sheets

LOCKING SEATBELT BUCKLE

BACKGROUND

A vehicle may include a seat and a seatbelt assembly. The seatbelt assembly may include a seatbelt retractor and webbing retractably payable from the seatbelt retractor. The seatbelt assembly may include an anchor coupled to the webbing, and a latch plate that engages a buckle. The seatbelt assembly may be disposed adjacent to a seat of the vehicle. The webbing may extend continuously from the seatbelt retractor through a webbing guide to the anchor. For example, one end of the webbing feeds into the seatbelt retractor, and the other end of the webbing is fixed to the anchor. The seatbelt buckle may include a releasable latch mechanism to retain the latch plate and a release button to release the latch plate when manually depressed.

DETAILED DESCRIPTION

Figure 1:
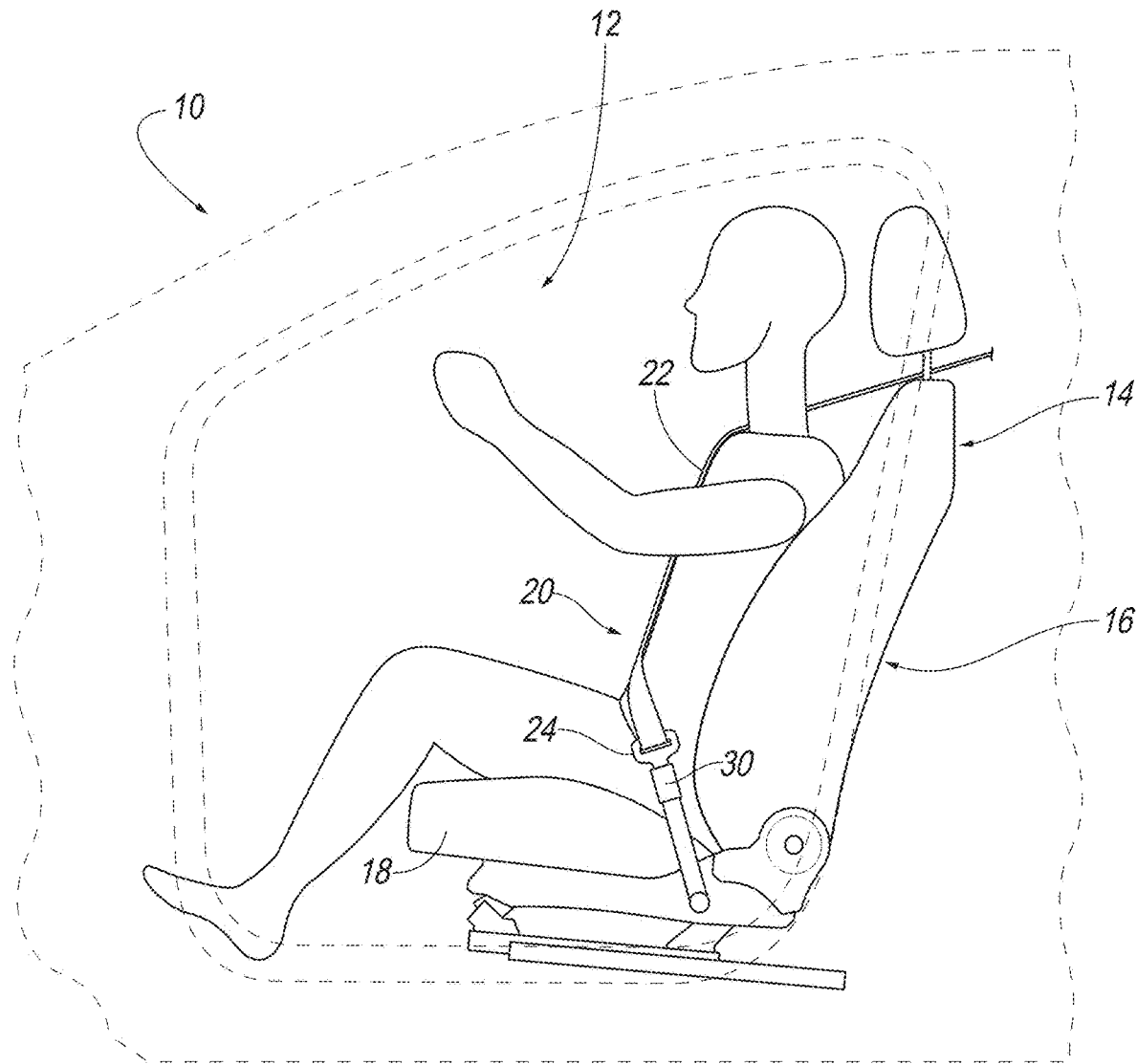
FIG. 1 is a side view of a portion of a vehicle including a locking seatbelt buckle.

A seatbelt buckle includes a frame attachable to a vehicle and operable to receive a seatbelt latch plate therein. A retainer is carried by the frame and movable between a latched position and an unlatched position. A resilient member is positioned between the frame and the retainer to urge the retainer toward the unlatched position. An actuator is positioned to lock the retainer in the latched position when activated, thereby preventing removal of the seatbelt latch plate from the frame.

The actuator can be an electronic solenoid.

The electronic solenoid can include a normally retracted pin and the pin is extendable when the actuator is activated.

The seatbelt buckle can include an over-ride button positioned to retract the pin when the over-ride button is manually depressed.

The over-ride button can extend laterally with respect to a longitudinal axis of the frame.

The seatbelt buckle can include a release button coupled to the retainer.

The release button can be positioned to unlatch the retainer when the release button is manually depressed, and the pin is retracted.

The seatbelt buckle can include an arm moveable between an enable position and a disable position where the arm prevents the pin from extending.

The arm can be coupled to a rack and pinion mechanism operative to move the arm between the enable position and the disable position.

The pinion can be coupled to a cylinder operative to receive a vehicle key.

The seatbelt buckle can include an arm moveable between an enable position and a disable position where the arm prevents the actuator from locking the retainer in the latched position.

The retainer can be slidably movable along a longitudinal axis of the frame.

At least a portion of the retainer can extend laterally from the frame.

The actuator can be positioned to block movement of the retainer along the longitudinal axis when activated.

The seatbelt buckle can include an over-ride button positioned to retract the pin when the over-ride button is manually depressed, and a release button positioned to unlatch the retainer when the release button is manually depressed, and the pin is retracted.

The seatbelt buckle can include a housing surrounding the frame.

The release button can be slidable along a longitudinal axis of the frame.

The actuator is positioned to block movement of the retainer along the longitudinal axis when activated.

The resilient member can be a compression spring.

The resilient member can extend along a longitudinal axis of the frame.

With reference to the Figures, where like numerals indicate like features throughout the several views, an example of a locking seatbelt buckle 30 includes a frame 40 attachable to a vehicle 10 and operative to receive a seatbelt latch plate 24 therein. A retainer 42 is carried by the frame 40 and movable between an unlatched position (FIG. 3) and a latched position (FIG. 4). A resilient member 48 is positioned between the frame 40 and the retainer 42 to urge the retainer 42 toward the unlatched position. An actuator 50 is positioned to lock the retainer 42 in the latched position when activated, thereby preventing removal of the seatbelt latch plate 24 from the frame 40.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may define a passenger cabin 12 to house occupants, if any, of the vehicle 10. The passenger cabin 12 may extend across the vehicle 10, e.g., from a left side of the vehicle 10 to a right side of the vehicle 10. The passenger cabin 12 includes a front end and a rear end with the front end being in front of the rear end during forward movement of the vehicle 10.

One or more seat assemblies 14 may be supported in the passenger cabin 12, e.g., by a floor of the vehicle 10. Each seat assembly 14 can include a seatback 16 and a seat bottom 18 that can support the occupant of the seat assembly 14. For example, the occupant of the seat assembly 14 may sit atop a top surface of the seat bottom 18 and recline against the seatback 16. While seat 14 shown in the Figures is in the passenger position, the disclosed technology can be applied to any seat in the vehicle.

The seat bottom 18 can include a seat bottom frame and the seatback 16 can include a seatback frame. The frames may include tubes, beams, etc. The seatback frame and the seat bottom frame may be of any suitable plastic material, e.g., carbon fiber reinforced plastic (CFRP), glass fiber-reinforced semi-finished thermoplastic composite (organosheet), etc. As another example, some or all components of the seatback frame and the seat bottom frame may be formed of a suitable metal, e.g., steel, aluminum, etc.

The seatback 16 is supported by the seat bottom 18. The seat bottom 18 extends from the seatback 16 in the seat-forward direction of the seat assembly 14. The seatback 16 may be stationary or movable relative to the seat bottom 18. The seatback 16 and the seat bottom 18 may be adjustable in multiple degrees of freedom. Specifically, the seatback 16 and the seat bottom 18 may themselves be adjustable, in other words, adjustable components within the seatback 16 and/or the seat bottom 18, and/or may be adjustable relative to each other.

The seatback 16 and the seat bottom 18 can include suitable covers. The covers may include upholstery and padding. The upholstery may be cloth, leather, faux leather, or any other suitable material. The upholstery may be stitched in panels around the frames. The padding may be between the upholstery and the frames. The padding may be foam or any other suitable material.

Each seat assembly 14 has an associated seatbelt assembly 20. The seatbelt assembly 20 can include a retractor (not shown) and a webbing 22. The webbing 22 is retractably payable from the retractor. The seatbelt assembly 20 may include an anchor (not visible) fixed to the webbing 22 and a latch plate 24 that engages a buckle 30. In an example, the buckle 30 can be attached to the seat bottom 18. The webbing 22 may extend continuously from the retractor to the anchor. The latch plate 24 may slide freely along the webbing 22, and when engaged with the buckle 30, divide the webbing 22 into a lap belt and a shoulder belt. The webbing 22 may be fabric, e.g., polyester.

Figure 2:
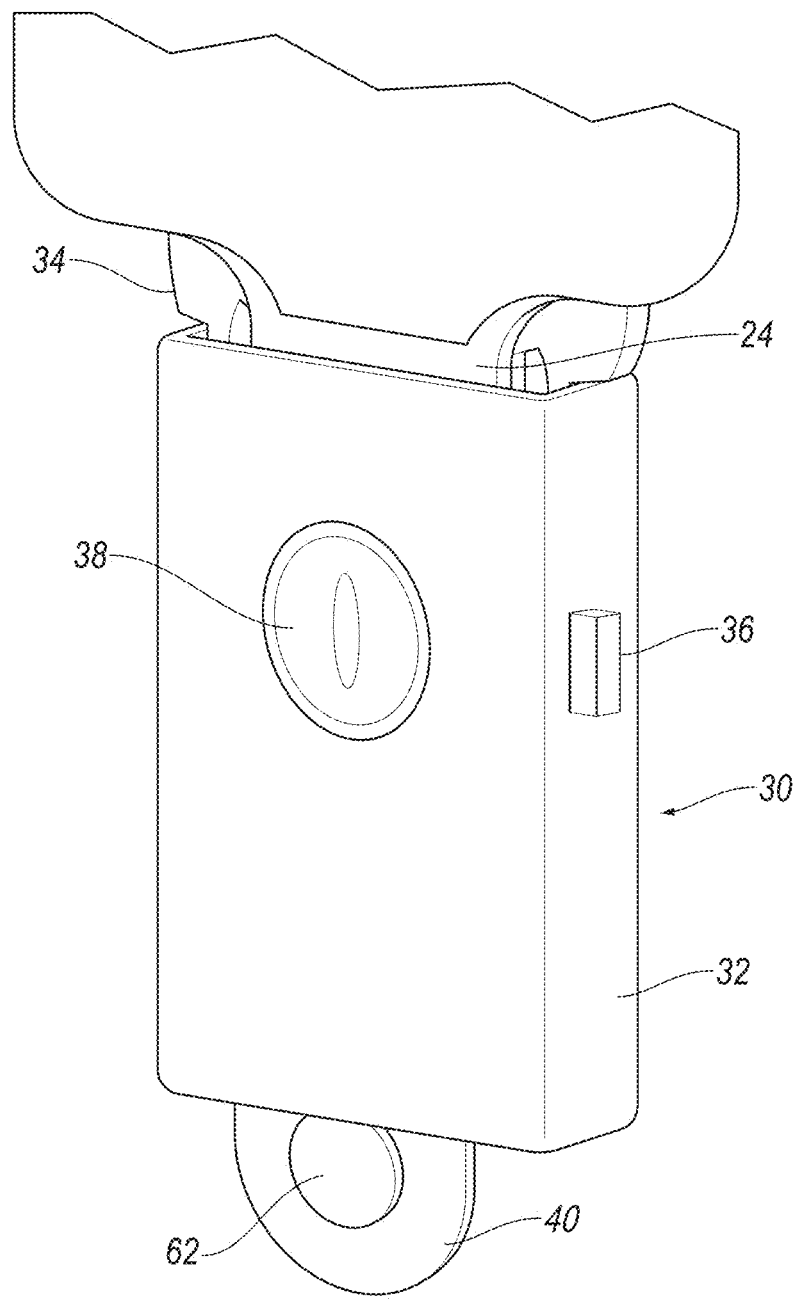
FIG. 2 is a perspective view of a locking seatbelt buckle.

With reference to FIG. 2, the locking seatbelt buckle 30 can include a releasable latch mechanism to retain the latch plate 24 and a release button 34 to release the latch plate 24 when manually depressed. However, when the locking seatbelt buckle 30 is activated, as explained more fully below, the latch plate 24 is prevented from being removed from the buckle 30. The buckle 30 includes a frame 40 attachable to the vehicle 10 (e.g., the vehicle frame) via a rivet 62, for example. Thus, when the latch plate 24 is retained in the buckle 30, it is secured to the vehicle along with the seatbelt webbing 22. The locking seatbelt buckle 30 can include lock over-ride buttons 36 and a lock disable mechanism 38. The locking seatbelt buckle 30 can include a housing 32 surrounding the frame 40. In an example, the housing 32 and release button 34 can be molded plastic or other suitable material. In an example, the frame 40 may be formed of a suitable metal, e.g., steel, aluminum, etc.

Figure 3:
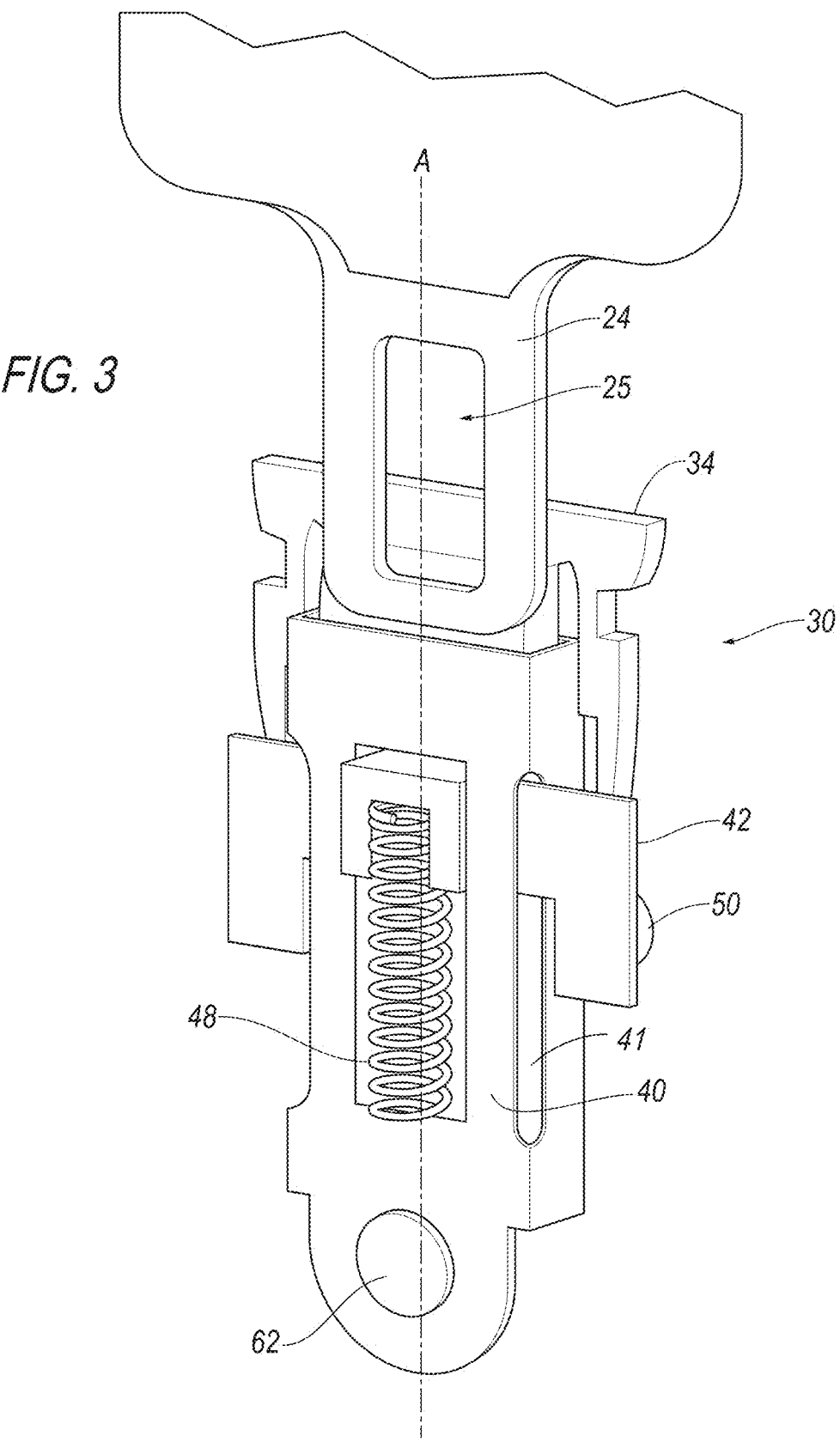
FIG. 3 is a partial perspective view of the locking seatbelt buckle of FIG. 2 in an unlatched position.
Figure 4:
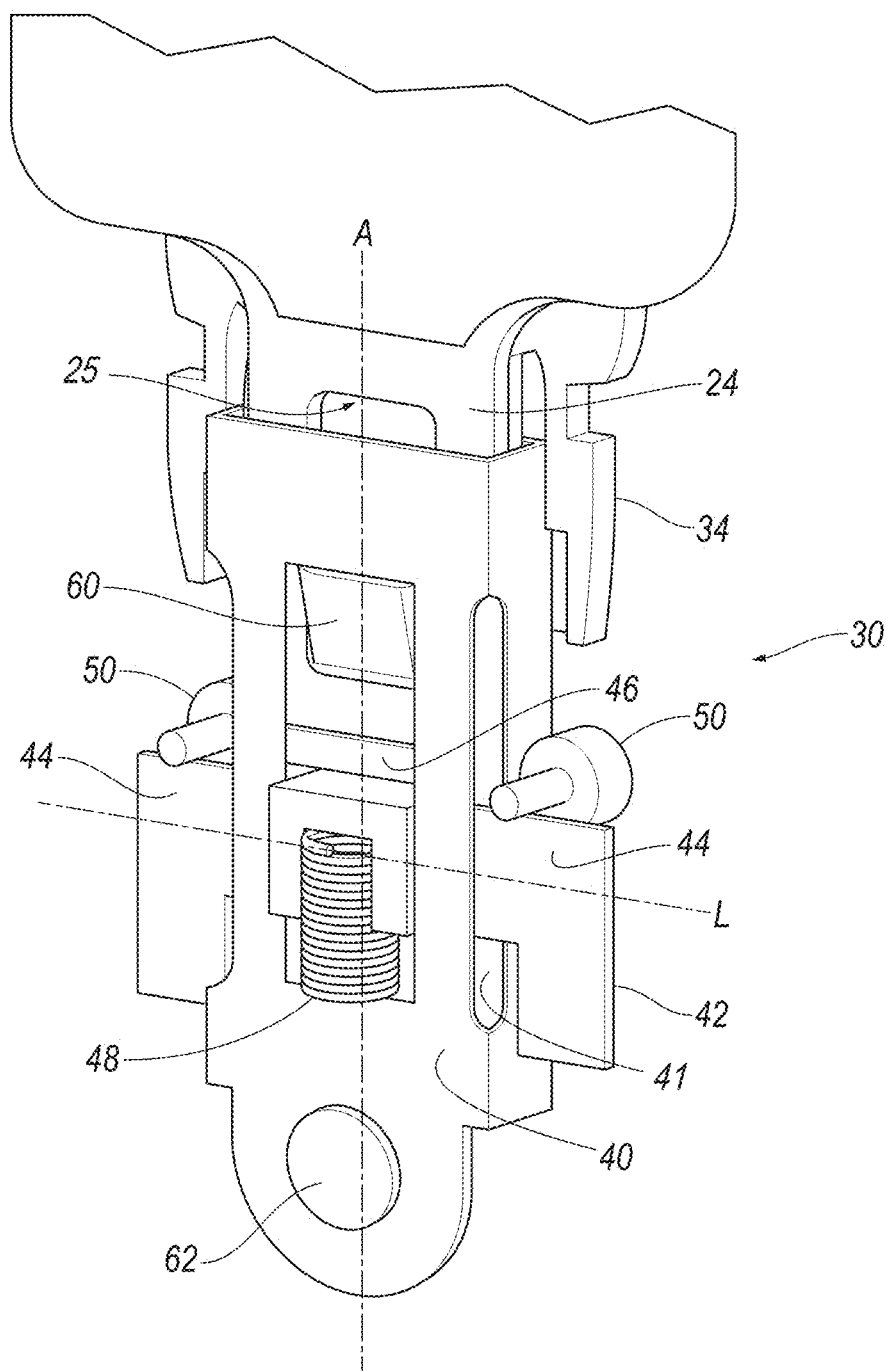
FIG. 4 is a partial perspective view of the locking seatbelt buckle of FIGS. 2 and 3 locked in a latched position.

As shown in FIG. 3, the frame 40 is configured to receive the seatbelt latch plate 24. A retainer 42 is carried by the frame 40 and movable between an unlatched position (FIG. 3) and a latched position (FIG. 4). A resilient member, such as compression spring 48, is positioned between the frame 40 and the retainer 42 to urge the retainer 42 toward the unlatched position. In some examples, the frame 40 can be a channel extending along a longitudinal axis A. The retainer 42 can slide longitudinally along slots 41 formed through the sides of the frame 40 as shown. The release button 34 is also slidable along the longitudinal axis of the frame.

With reference to FIG. 4, the latch plate 24 pushes the retainer 42 down longitudinally as it is inserted into the frame 40. The latch plate 24 includes an aperture 25 that is engaged by a latch 60 once it is fully inserted into the frame 40. The latch plate 24 pushes against a crossbar 46, which extends between lateral portions 44 of the retainer 42. The lateral portions of the retainer 42 extend from the frame 40 in a lateral direction L. The compression spring 48 pushes upward against the crossbar 46 to urge the retainer 42 upward. Pressing the release button 34 downward along the longitudinal axis A moves the latch 60 away from the latch plate 24 to disengage the latch 60 from the latch plate 24. Once the latch 60 is disengaged from the latch plate 24 the retainer 42 can move upward to eject the latch plate 24 from the frame 40.

A pair of actuators 50 are positioned to selectively lock the retainer 42 in the latched position when activated, thereby preventing removal of the seatbelt latch plate 24 from the frame 40. The actuators 50 extend into the path of the retainer 42, specifically, the lateral portions 44, to block the retainer's upward movement along the longitudinal axis A. The actuators 50 can be mounted to the frame 40 with suitable hardware, welds, etc.

Figure 5:
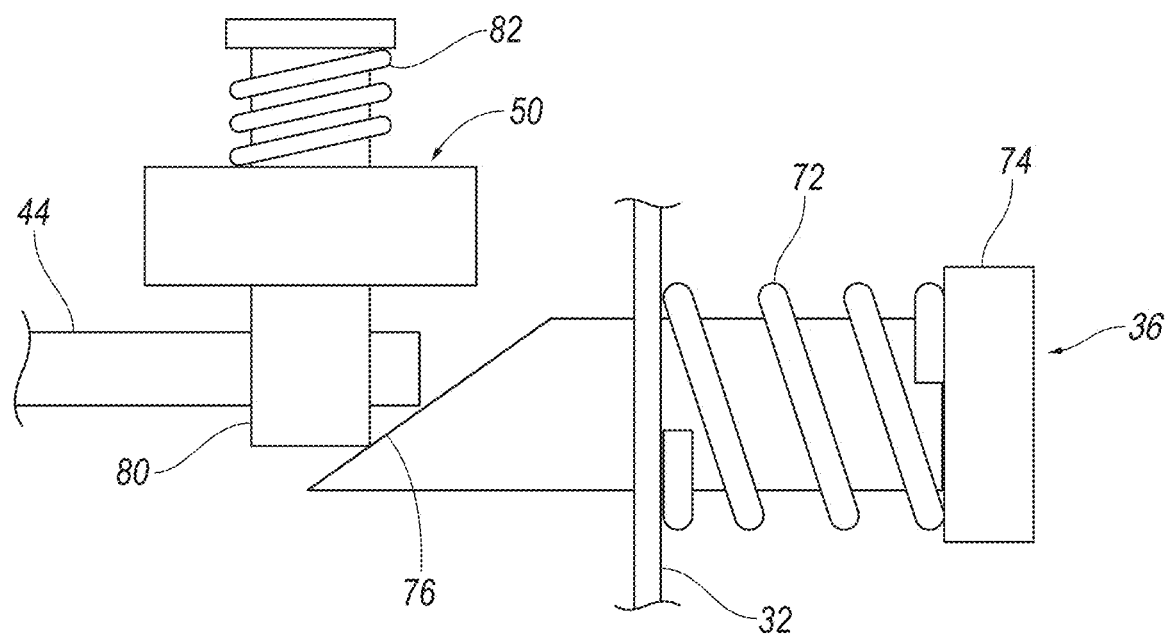
FIG. 5 is an enlarged top view illustrating the operation of a lock over-ride button.

Referring to FIG. 5, the actuators 50 can be electronic solenoids including a normally retracted pin 80 that extends when the actuator 50 is activated. The solenoids 50 can include a spring 82 positioned to maintain the pins 80 in the retracted position until the solenoid is energized or activated.

In an example, the locking seatbelt buckle 30 can include lock over-ride buttons 36 positioned to retract the pin 80 when the over-ride button 36 is manually depressed. The over-ride button 36 extends laterally with respect to the longitudinal axis A. The over-ride button 36 includes a ramped surface 76 that pushes the pin 80 toward the retracted position as the button head 74 is manually depressed inward against spring 72. The over-ride button 36 pushes the pin 80 back toward the retracted position such that the retainer 42 can clear the pin 80 allowing the retainer 42 to eject the latch plate 24. The locking seatbelt buckle solenoids 50 can be overridden to release the latch plate 24 by pressing the over-ride buttons 36 at the same time the release button 34 is depressed.

Figure 6:
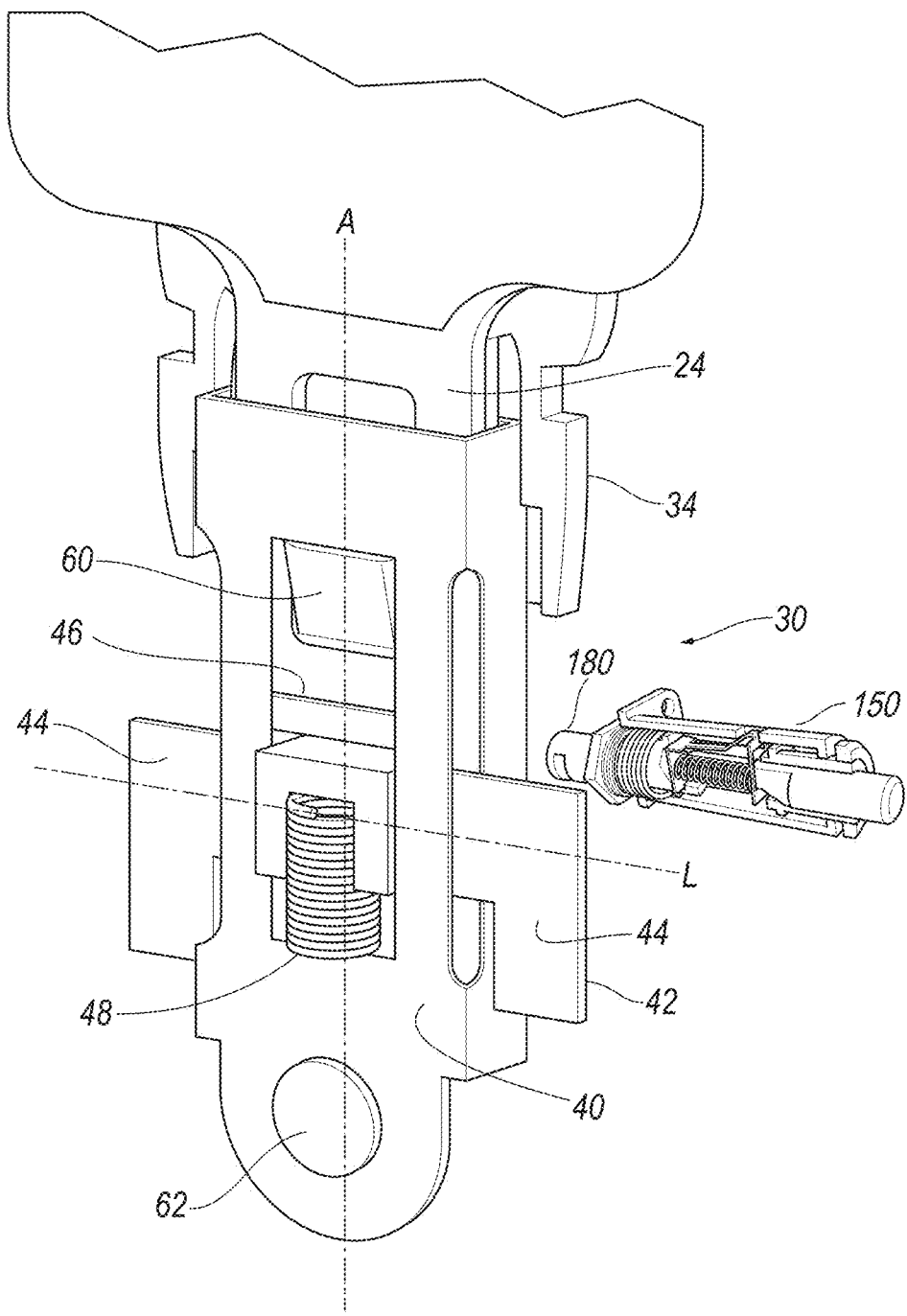
FIG. 6 is a partial perspective view of a locking seatbelt buckle mechanically locked in a latched position.

In another example, as shown in FIG. 6, a suitable mechanical mechanism, such as a latching push-button mechanism 150, can be positioned to selectively lock the retainer 42 in the latched position, thereby preventing removal of the seatbelt latch plate 24 from the frame 40. In some examples, two latching push-button mechanisms 150 can be used. Pushing the latching push-button mechanism 150 extends the plunger 180 and pushing the push-button again retracts the plunger 180. The plunger 180 extends into the path of the retainer 42, specifically, the lateral portions 44, to block the retainer's upward movement along the longitudinal axis A. The latching push-button mechanism 150 can be mounted to the frame 40 and/or housing 32 with suitable hardware, welds, etc.

Figure 7A:
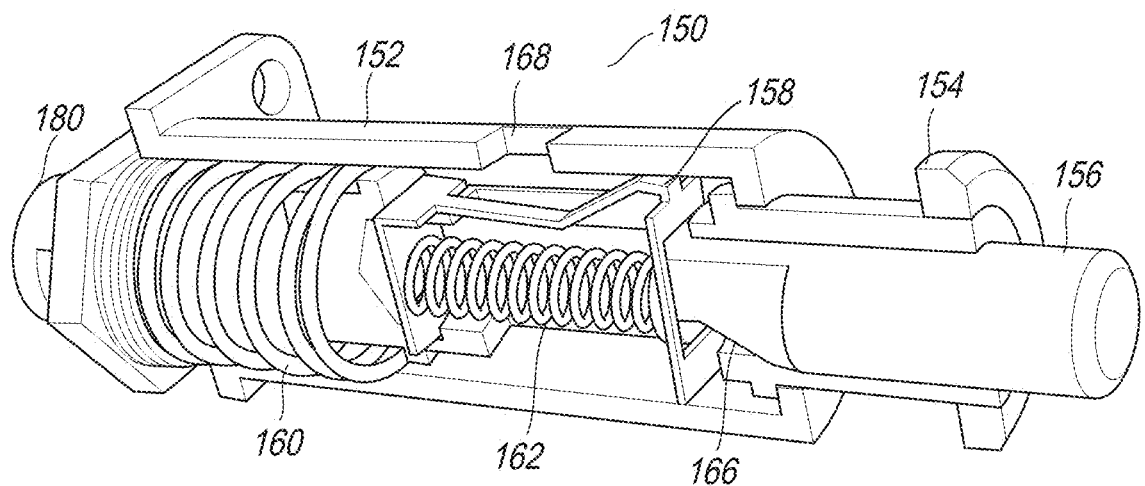
FIG. 7A is a partial cross-section view of a latching push-button mechanism in a retracted position.
Figure 7B:
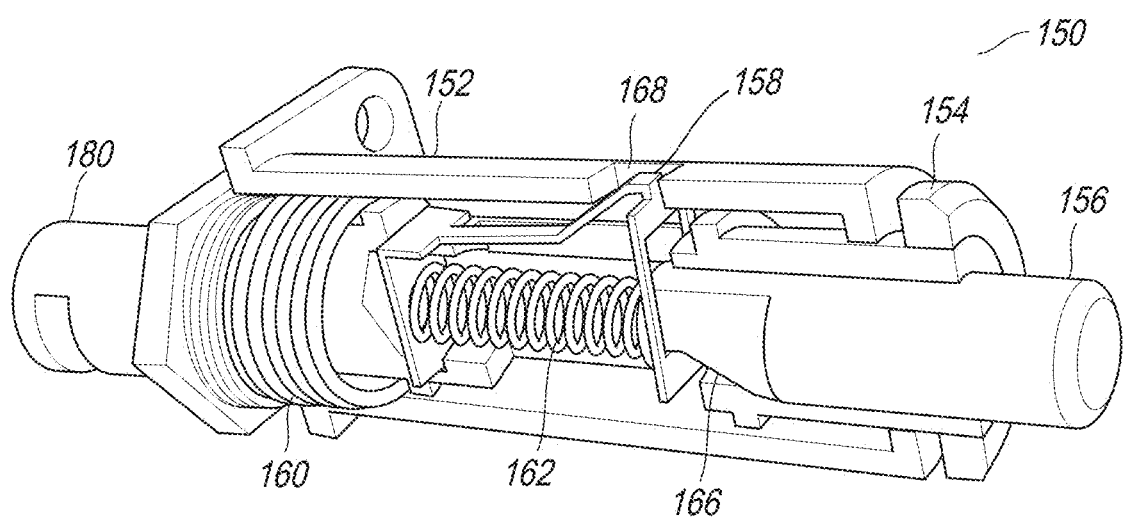
FIG. 7B is a partial cross-section view of the latching push-button mechanism in an extended position.

Referring to FIGS. 7A and 7B, the latching push-button mechanism 150 includes a housing 152 carrying the plunger 180. The plunger 180 includes an outer button portion 154. An inner release button 156 is slideably disposed in the outer button portion 154 as shown. When the outer button portion 154 is pushed against spring 160, the plunger 180 moves from a retracted position shown in FIG. 7A to an extended position as shown in FIG. 7B. The spring 160 is positioned in the housing 152 to bias the plunger to the retracted position. Once the plunger 180 is extended, a latch spring 158 engages an aperture 168, formed through the housing 152, to retain the plunger 180 in the extended position (FIG. 7B). The latch spring 158 is positioned on the plunger 180 such that it is biased toward the aperture 168.

When the inner release button 156 is pushed against spring 162, the ramped surface 166 of the inner release button 156 pulls the latch spring 158 away from the aperture 168 thereby disengaging the latch spring 158 from the aperture 168 to allow the spring 160 to retract the plunger 180 into the housing 152 (FIG. 7A).

Figure 8:
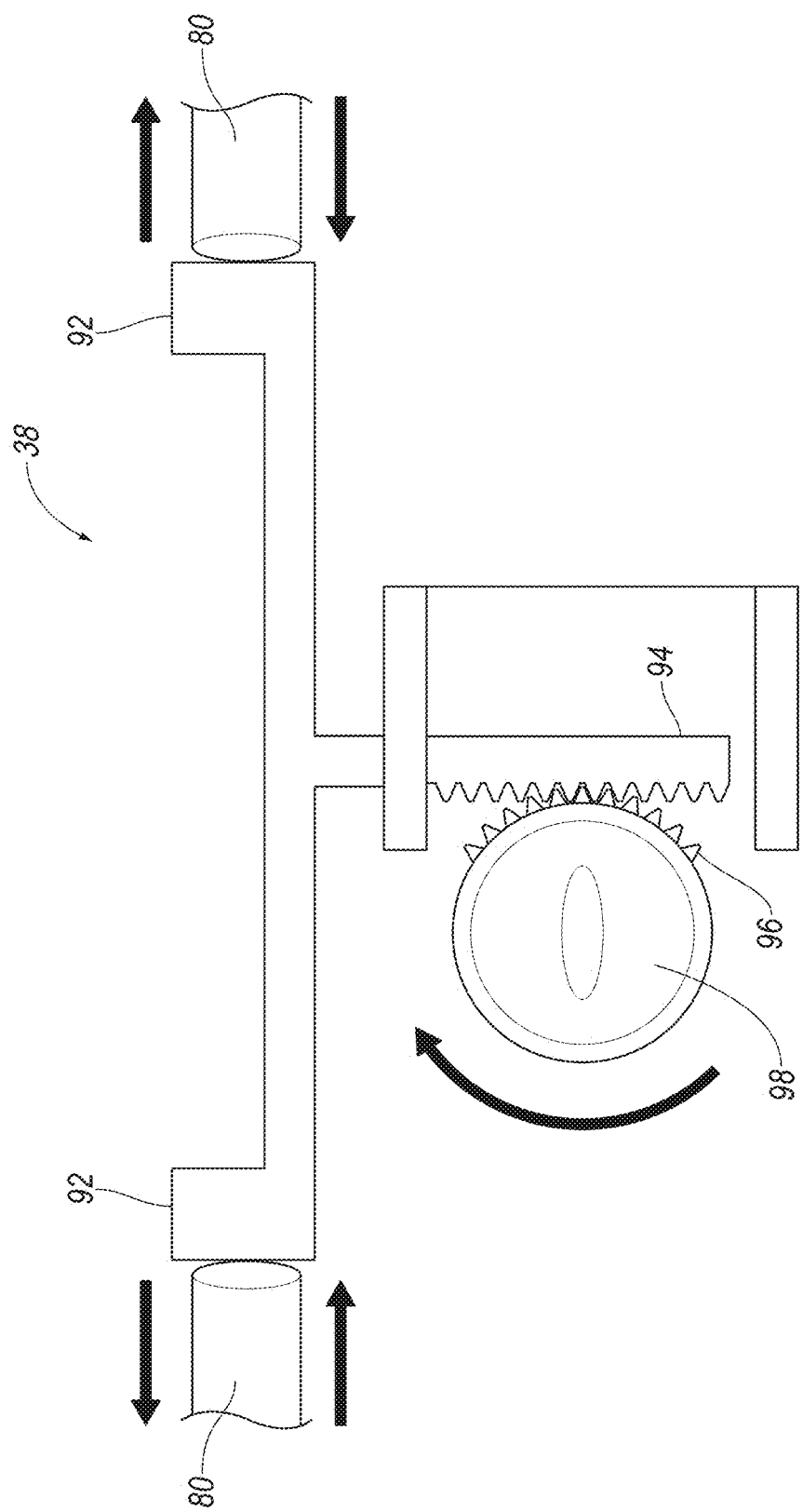
FIG. 8 is a schematic illustration of a lock disable mechanism.

FIG. 8 is a schematic diagram representing the lock disable mechanism 38. In an example, the lock disable mechanism 38 can include arms 92 moveable between an enable position and a disable position (FIG. 8) where the arms 92 prevent the actuators 50 (or the latching push-button mechanism 150) from locking the retainer 42 in the latched position. The arms 92 are moveable between the enable position and the disable position where the arm prevents the actuator pin 80 (or plunger 180) from extending. In an example, the arms 92 are coupled to a rack 94 and pinion 96 mechanism operative to move the arm 92 between the enable and disable positions. The pinion 96 can be coupled to a lock cylinder 98 operative to receive a vehicle key. When the cylinder 98 is turned counter-clockwise, the arms 92 are moved to the disable position where they block the pins 80 from extending thereby preventing the actuators 50 from locking the retainer 42 in the latched position. When the cylinder 98 is turned clockwise, the arms 92 are moved toward the enable position.

Figure 9:
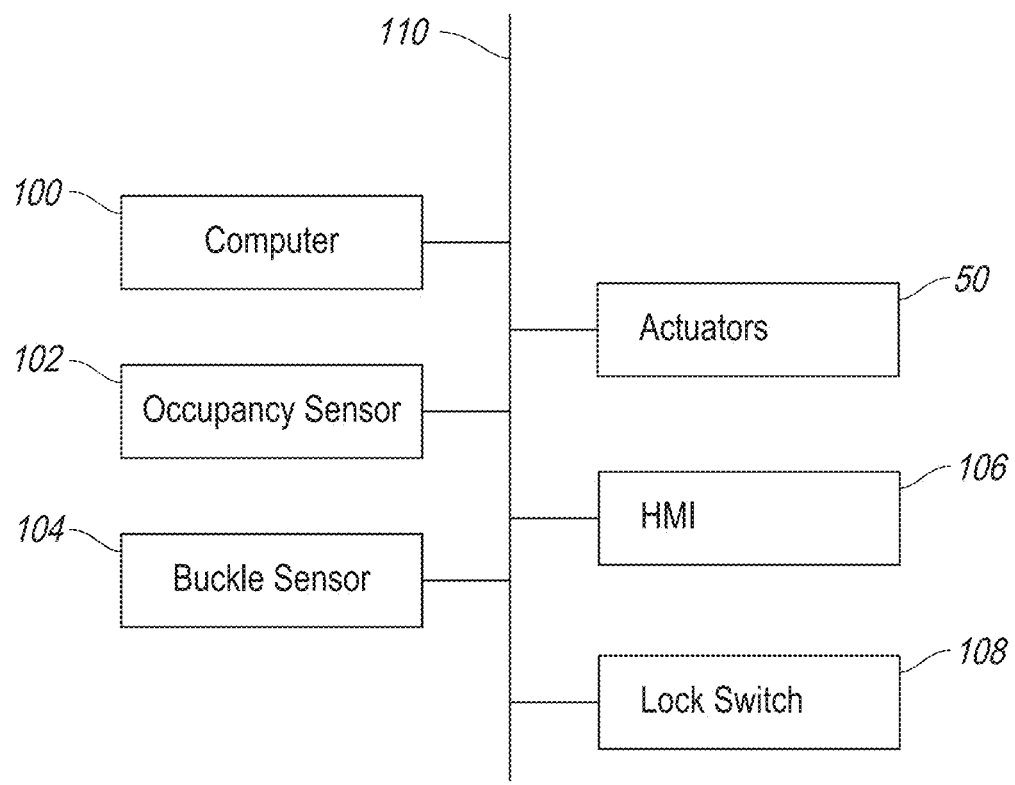
FIG. 9 is a block diagram of a system of the vehicle.

With reference to FIG. 9, an example system of vehicle 10 can include a seatbelt assembly 20 as well as a computer 100, a network 110, and various sensors, including occupancy sensors 102 and a buckle sensor 104. The vehicle 10 may include occupancy sensors 102 configured to detect occupancy of the seat assembly 14. The vehicle 10 may include a buckle sensor 104 that detects engagement of the latch plate 24 of the seatbelt assembly 20 with the buckle 30. The buckle sensor 104 may include a switch, a contact sensor, a hall effect sensor, or any other suitable structure for detecting engagement of the latch plate 24 with the buckle 30, including conventional structures. The buckle sensor 104 provides data to the computer 100 indicating whether the latch plate 24 is engaged with, or disengaged from, the buckle 30.

The computer 100 may be in communication with the occupancy sensors 102 via the network 110. The occupancy sensors 102 may be coupled to the seat assemblies 14 to identify when an occupant is seated in the seat assemblies 14. As an example, the occupancy sensors 102 may indicate to the computer 100 that a seat assembly 14 is occupied. For example, the occupancy sensors 102 may communicate to the computer 100, e.g., by sending a signal to the computer 100, that the seat assembly 14 is occupied and in the absence of such communication the computer 100 may classify the seat assembly 14 as unoccupied. As another example, the occupancy sensors 102 may be configured to communicate to the computer 100 that the seat assembly 14 is occupied when the seat assembly 14 is occupied and to communicate to the computer 100 that the seat assembly 14 is unoccupied when the seat assembly 14 is unoccupied, e.g., by sending a signal to the computer 100 when the seat assembly 14 is occupied and unoccupied indicating occupancy or lack thereof.

The occupancy sensors 102 may be, for example, a weight sensor, image detection, a seatbelt buckle sensor 104, etc. The vehicle 10 may include any suitable number of occupancy sensors 102. For example, the vehicle 10 may include a number of occupancy sensors 102 equal to the number of seats 14 in the vehicle 10. Specifically, in some examples, the occupancy sensor 102 may be of a conventional type currently known in the art.

The vehicle 10 may include a communication network 110. The communication network 110 includes hardware, such as a communication bus, for facilitating communication among vehicle 10 components, e.g., the computer 100, the occupancy sensors 102, the buckle sensor 104, the actuators 50, etc. The communication network 110 may facilitate wired or wireless communication among the vehicle 10 components in accordance with a number of communication protocols such as controller area network (CAN), Ethernet, Wi-Fi, Local Interconnect Network (LIN), and/or other wired or wireless mechanisms. Alternatively or additionally, in cases where the computer 100 comprises a plurality of devices, the communication network 110 may be used for communications between devices represented as the computer 100 in this disclosure.

The computer 100 may be a microprocessor-based computer implemented via circuits, chips, or other electronic components. The computer 100 includes a processor, a memory, etc. The memory of the computer 100 may include memory for storing programming instructions executable by the processor as well as for electronically storing data and/or databases. For example, the computer 100 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 100 may be a restraints control module. In another example, computer 100 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 100. The memory can be of any type, e.g., hard disk drives, solid state drives, servers, or any volatile or non-volatile media. The memory can store the collected data sent from the sensors.

The computer 100 is programmed to, i.e., the memory stores instructions executable by the processor to, command the actuators 50 to e.g., extend locking pins 80 in response to an input from an HMI 106 or a dedicated switch 108. The computer can also send a notification to e.g., the HMI 106 indicating that the seat buckle 30 is locked.

The computer 100 may determine that the latch plate of the seatbelt assembly 20 is engaged with the buckle based on information received from the buckle sensor 104 via the communication network 110. In an example, the computer 100 may be programmed to activate the actuators 50 in response to the lock switch 108 or the HMI 106 and when the computer 100 has determined that the latch plate 24 is engaged with the buckle 30.

When a user wants to unlock the buckle 30 can provide corresponding input to the HMI 106 or via switch 108. If a user wants to manually unlock the seatbelt buckle 30 the two over-ride buttons 36 can be depressed while at the same time pressing the release button 34. If the buckle 30 is manually released, the computer 100 can provide a notification indicating that the seatbelt buckle 30 was unlocked.

Computing devices, such as the computer 100, generally include computer-executable instructions, where the instructions may be executable by one or more computing devices such as those listed above. Computer-executable instructions may be compiled or interpreted from computer programs created using a variety of programming languages and/or technologies. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention. Any use of "based on" and "in response to" herein, including with reference to media, processes, systems, methods, etc. described herein, indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt buckle, comprising:
a frame operable to receive a seatbelt latch plate;
a retainer carried by the frame and movable between a latched position and an unlatched position;
a resilient member positioned between the frame and the retainer to urge the retainer toward the unlatched position;
an actuator positioned to lock the retainer in the latched position when activated, the actuator being an electronic solenoid including a pin, the pin being retracted when the actuator is deactivated and the pin being extended when the actuator is activated;
an over-ride button positioned to retract the pin when the over-ride button is manually depressed; and
a release button positioned to unlatch the retainer when the release button is manually depressed and the pin is retracted.

2. The seatbelt buckle of claim 1, wherein the over-ride button extends laterally with respect to a longitudinal axis of the frame.

3. The seatbelt buckle of claim 1, wherein the release button is coupled to the retainer.

4. The seatbelt buckle of claim 1, further comprising an arm moveable between an enable position and a disable position, the arm in the disabled position preventing the pin from extending.

5. The seatbelt buckle of claim 4, wherein the arm is coupled to a rack and pinion mechanism operative to move the arm between the enable position and the disable position.

6. The seatbelt buckle of claim 5, wherein the pinion is coupled to a cylinder operative to receive a vehicle key.

7. The seatbelt buckle of claim 1, wherein the retainer is slidably movable along a longitudinal axis of the frame.

8. The seatbelt buckle of claim 7, wherein at least a portion of the retainer extends laterally from the frame.

9. The seatbelt buckle of claim 8, wherein the actuator is positioned to block movement of the retainer along the longitudinal axis when activated.

10. The seatbelt buckle of claim 1, further comprising a housing surrounding the frame.

11. The seatbelt buckle of claim 10, wherein the release button is slidable along a longitudinal axis of the frame.

12. The seatbelt buckle of claim 11, wherein the actuator is positioned to block movement of the retainer along the longitudinal axis when activated.

13. The seatbelt buckle of claim 1, wherein the resilient member is a compression spring.

14. The seatbelt buckle of claim 13, wherein the resilient member extends along a longitudinal axis of the frame.

15. A seatbelt buckle, comprising:
a frame operable to receive a seatbelt latch plate;
a retainer carried by the frame and movable by the latch plate between a latched position and an unlatched position;
a latching push-button mechanism positioned to selectively lock the retainer in the latched position; and
a release button operable to release the latch plate from the latched position to the unlatched position when the release button is manually depressed and the latching push-button mechanism is unlocked from the retainer.

16. The seatbelt buckle as set forth in claim 15, further comprising a resilient member positioned between the frame and the retainer to urge the retainer toward the unlatched position.

17. The seatbelt buckle as set forth in claim 15, wherein the latching push-button mechanism includes a plunger extendable into a path of the retainer from the latched position to the unlatched position when the retainer is in the latched position.

18. The seatbelt buckle as set forth in claim 17, further comprising a resilient member positioned between the frame and the retainer to urge the retainer toward the unlatched position.

19. The seatbelt buckle of claim 15, further comprising an arm moveable between an enable position and a disable position, the arm in the disabled position preventing the latching push-button mechanism from locking the retainer in the latched position.

20. The seatbelt buckle of claim 19, wherein the arm is coupled to a rack and pinion mechanism operative to move the arm between the enable position and the disable position.

* * * * *